US011505691B2

(12) United States Patent
Cui et al.

(10) Patent No.: US 11,505,691 B2
(45) Date of Patent: Nov. 22, 2022

(54) AQUEOUS THICKENER BLEND COMPOSITION

(71) Applicants: Dow Global Technologies LLC, Midland, MI (US); Rohm and Haas Company, Collegeville, PA (US)

(72) Inventors: Longlan Cui, Shanghai (CN); Rui Wang, Shanghai (CN); Ling Li, Louyang (CN); Wei Gao, Fort Washington, PA (US)

(73) Assignees: Dow Global Technologies LLC, Midland (ML); Rohm and Haas Company, Collegeville, PA (US)

( * ) Notice: Subject to any disclaimer, the term of this patent is extended or adjusted under 35 U.S.C. 154(b) by 390 days.

(21) Appl. No.: 16/769,300

(22) PCT Filed: Dec. 14, 2018

(86) PCT No.: PCT/CN2018/121173
§ 371 (c)(1),
(2) Date: Jun. 3, 2020

(87) PCT Pub. No.: WO2019/128736
PCT Pub. Date: Jul. 4, 2019

(65) Prior Publication Data
US 2021/0171787 A1 Jun. 10, 2021

(30) Foreign Application Priority Data
Dec. 25, 2017 (WO) ................ PCT/CN2017/118187

(51) Int. Cl.
| | | |
|---|---|---|
| *C08F 236/20* | (2006.01) | |
| *C08F 2/22* | (2006.01) | |
| *C08F 2/38* | (2006.01) | |
| *C08F 220/06* | (2006.01) | |
| *C08K 5/19* | (2006.01) | |
| *C08L 33/08* | (2006.01) | |
| *C08L 5/00* | (2006.01) | |
| *C08L 29/04* | (2006.01) | |
| *C08L 71/02* | (2006.01) | |
| *C08L 75/08* | (2006.01) | |
| *C09D 7/43* | (2018.01) | |
| *C09D 7/44* | (2018.01) | |
| *C09D 133/08* | (2006.01) | |
| *C08F 220/18* | (2006.01) | |
| *C08F 2/00* | (2006.01) | |
| *C08F 220/28* | (2006.01) | |
| *C08F 222/10* | (2006.01) | |
| *C09D 5/02* | (2006.01) | |

(52) U.S. Cl.
CPC ............. *C08L 33/08* (2013.01); *C08F 2/001* (2013.01); *C08F 2/22* (2013.01); *C08F 2/38* (2013.01); *C08F 220/06* (2013.01); *C08F 220/1802* (2020.02); *C08F 220/1805* (2020.02); *C08F 220/1806* (2020.02); *C08F 220/286* (2020.02); *C08F 222/102* (2020.02); *C08F 236/20* (2013.01); *C08K 5/19* (2013.01); *C08L 5/00* (2013.01); *C08L 29/04* (2013.01); *C08L 71/02* (2013.01); *C08L 75/08* (2013.01); *C09D 5/024* (2013.01); *C09D 7/43* (2018.01); *C09D 7/44* (2018.01); *C09D 133/08* (2013.01); *C08F 2800/20* (2013.01); *C08L 2201/54* (2013.01); *C08L 2203/16* (2013.01); *C08L 2205/025* (2013.01)

(58) Field of Classification Search
CPC ............ C08F 220/286; C08F 220/1806; C08F 220/1805; C08F 220/1802; C08F 222/102; C08F 2/001; C08F 2/22; C08F 2/38; C08F 220/06; C08F 236/20; C08F 2800/20; C08K 5/19; C08L 33/08; C08L 5/00; C08L 29/04; C08L 71/02; C08L 75/08; C08L 2201/54; C08L 2203/16; C08L 2205/025; C09D 7/43; C09D 7/44; C09D 5/024; C09D 133/08
USPC ...................................... 525/328.9
See application file for complete search history.

(56) References Cited

U.S. PATENT DOCUMENTS

| | | | |
|---|---|---|---|
| 6,337,366 | B1 | 1/2002 | Amick et al. |
| 7,741,401 | B2 | 6/2010 | Harris et al. |
| 7,741,402 | B2 | 6/2010 | Bobsein et al. |
| 9,790,345 | B2 | 10/2017 | Hawkins et al. |
| 2007/0155880 | A1 | 7/2007 | Bobsein et al. |
| 2009/0143528 | A1 | 6/2009 | Mestach et al. |

(Continued)

FOREIGN PATENT DOCUMENTS

| | | |
|---|---|---|
| CN | 1213092 C | 8/2005 |
| CN | 1965042 | 5/2007 |

(Continued)

OTHER PUBLICATIONS

Supplementary European Search Report for the corresponding European Application No. 18897675 dated Aug. 17, 2021; 8 pages.
(Continued)

*Primary Examiner* — Kelechi C Egwim
(74) *Attorney, Agent, or Firm* — Karl E. Stauss; Cantor Colburn LLP

(57) ABSTRACT

An aqueous thickener blend composition comprising an aqueous hydrophobically-modified alkali soluble or alkali swellable thickener composition and an acid-suppressible associative thickener composition, affording high thickening efficiency and providing an aqueous coating composition comprising such aqueous thickener blend composition with good heat-age stability and color float stability.

15 Claims, No Drawings

(56) References Cited

U.S. PATENT DOCUMENTS

| | | |
|---|---|---|
| 2015/0203676 A1 | 7/2015 | Li |
| 2016/0168291 A1 | 6/2016 | Fan et al. |
| 2016/0208128 A1 | 7/2016 | Kehrloesser et al. |

FOREIGN PATENT DOCUMENTS

| | | | | |
|---|---|---|---|---|
| CN | 101407624 B | 4/2009 | | |
| CN | 101003702 B | 4/2011 | | |
| CN | 105408374 | 3/2016 | | |
| EP | 0444791 A1 | 9/1991 | | |
| EP | 1431324 A2 | 6/2004 | | |
| EP | 2166044 A1 | 3/2010 | | |
| WO | 2016095197 | 6/2016 | | |
| WO | WO-2016095197 A1 * | 6/2016 | ................ | C08F 2/22 |
| WO | 2017058849 | 4/2017 | | |
| WO | 2017214918 A1 | 12/2017 | | |
| WO | WO-2017214918 A1 * | 12/2017 | ................ | C08F 2/22 |
| WO | 2019126914 | 7/2019 | | |

OTHER PUBLICATIONS

Brandrup, Polymer Handbook, 1999, 4th ed.
Fox, "Session J," Bull. Am. Physics Soc., 1956, p. 123, vol. 1, No. 3.

* cited by examiner

AQUEOUS THICKENER BLEND COMPOSITION

FIELD OF THE INVENTION

The present invention relates to an aqueous thickener blend composition and an aqueous coating composition comprising the same.

INTRODUCTION

Thickeners are widely used to in aqueous compositions to obtain the desired degree of viscosity needed for the proper formulation and application of the aqueous compositions. One general type of thickeners used in aqueous compositions is referred to in the art as an associative thickener. Associative thickeners typically are water soluble over a broad pH range of from 2 to 10, and are thus relatively pH-independent, such as hydrophobically modified ethoxylated urethane (HEUR) thickeners. Another type of thickener used in aqueous compositions is referred to in the art as an alkali soluble or alkali swellable emulsion thickener, with or without hydrophobic modification (HASE or ASE thickeners respectively), which thickens aqueous polymer systems effectively at pH values of 6 and greater because they are typically water insoluble at pH values of less than 6 and water soluble at pH values of greater than 6. The alkali soluble or alkali swellable emulsion thickeners are typically provided in the emulsion form at pH values below 5.

To provide a balance of properties that cannot be provided by a single thickener, it is desirable to be able to blend two or more different thickeners into a single product. For example, U.S. Pat. No. 7,741,401 discloses blends of pH-independent soluble associative thickeners with ASE and/or HASE thickeners such as ACRYSOL™ TT-935 linear HASE and ACRYSOL™ ASE-60 thickener (from The Dow Chemical Company. ACRYSOL is a trademark of The Dow Chemical Company) at a viscosity that can be handled and poured readily. Unfortunately, aqueous compositions comprising these thickener blends still have color float stability issues and/or viscosity increase when subjected to heat aging, particularly when HASE thickener is the major component of the blends. The color float stability property may be improved by increasing the dosage of associative thickeners, but this has the drawback of reduced thickening efficiency and increased formulation cost, meanwhile, the dosage of HASE thickener is usually limited due to poor storage stability.

Thus, there remains a need in the art for thickener blends providing aqueous compositions with balanced properties of storage stability and color float stability.

SUMMARY OF THE INVENTION

The present invention provides a novel aqueous thickener blend composition and an aqueous coating composition comprising the same. The aqueous thickener blend composition of the present invention can afford high thickening efficiency, for example, less than 10 grams of solids of such aqueous multistage polymer dispersion needed to afford the viscosity of the aqueous coating composition of 100 Krebs Units (KU). The aqueous coating composition of the present invention have improved storage stability after heat-aging (herein "heat-age stability"), for example, at 50-60° C., as indicated by a viscosity change within ±10 KU. The thickening efficiency and the heat-age stability are measured according to the test methods described in the Examples section below. The aqueous coating composition of the present invention can also have better color float stability with a color float stability score of 8 or higher after storage for one month at 50° C.

In a first aspect, the present invention is an aqueous thickener blend composition comprising:

(i) an aqueous hydrophobically-modified alkali soluble or alkali swellable thickener composition comprising a multistage polymer, wherein the multistage polymer comprises a polymer A and a polymer B at a weight ratio of the polymer A to the polymer B is from 95:5 to 55:45;

wherein the polymer A comprises, by weight based on the weight of the polymer A, (a1) 15% or more of structural units of an $\alpha$, $\beta$-ethylenically unsaturated carboxylic acid, (a2) structural units of a monoethylenically unsaturated nonionic monomer, (a3) less than 0.1% of structural units of a hydrophobic associated monomer, and optionally (a4) structural units of a crosslinker selected from a $C_3$-$C_{20}$ alkylene glycol di(meth)acrylate, a poly(alkylene glycol) di(meth)acrylate, and combinations thereof; and wherein the polymer B comprises, by weight based on the weight of the polymer B, (b1) 15% or more of structural units of an $\alpha$, $\beta$-ethylenically unsaturated carboxylic acid, (b2) structural units of a monoethylenically unsaturated nonionic monomer, (b3) from 0.1% to 60% by weight of structural units of a hydrophobic associated monomer, and (b4) structural units of a crosslinker selected from a $C_3$-$C_{20}$ alkylene glycol di(meth)acrylate, a poly(alkylene glycol) di(meth)acrylate, and combinations thereof; and (ii) an aqueous acid-suppressible associative thickener composition comprising, based on the weight of the aqueous acid-suppressible associative thickener composition, (a) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone, wherein one or more of the hydrophobic groups comprises a secondary amine, a tertiary amine, a tertiary phosphine, or a combination thereof, and optionally a quaternary amine, with the proviso that less than 80% of the total amine functionality is a quaternary amine; (b) sufficient acid to substantially protonate the secondary amine, the tertiary amine, the tertiary phosphine, or a combination thereof; (c) 40% to 99% by weight of water; and (d) zero to 15% by weight of an organic co-solvent, surfactant, cyclodextrin compound, or combination thereof;

wherein the dry weight ratio of the multistage polymer to the acid-suppressible associative thickener is in the range of from 99:1 to 65:35.

In a second aspect, the present invention is a process of preparing an aqueous thickener blend composition the first aspect.

In a third aspect, the present invention is an aqueous coating composition comprising an aqueous thickener blend composition of the first aspect, and a binder.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and M2, $$\frac{1}{T_g(\text{calc.})} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, or the monomer in polymerized form. For example, a structural unit of methyl methacrylate is as illustrated:

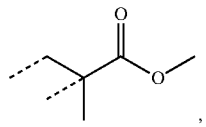

where the dotted lines represent the points of attachment of the structural unit to the polymer backbone.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

The term "associative thickeners" is known in the art, and refers to thickeners that act via an associative mechanism. The associative mechanism enables the unique set of properties exhibited by the associative thickeners in particular. For example, in latex based coatings, polyether associative thickeners are known to provide improved flow and leveling and better film build compared to high molecular weight, non-associative thickeners.

The aqueous thickener blend composition of the present invention comprises an aqueous hydrophobically modified alkali soluble or swellable (HASE) thickener composition. The HASE thickener composition comprises a multistage polymer. The multistage polymer typically in the aqueous dispersion comprises at least one polymer A and at least one polymer B that is different from the polymer A, which are formed in different stages of multistage free-radical polymerization.

The polymer A in the multistage polymer may comprise structural units of one or more α, β-ethylenically unsaturated carboxylic acids (a1). Examples of suitable α, β-ethylenically unsaturated carboxylic acids include an acid-bearing monomer such as acrylic acid, methacrylic acid, maleic acid, itaconic acid, crotonic acid, or fumaric acid; a monomer bearing an acid-forming group which yields or is subsequently convertible to, such an acid group (such as anhydride, (meth)acrylic anhydride, or maleic anhydride); or mixtures thereof. The polymer A may comprise, by weight based on the weight of the polymer A, 15% or more, 20% or more, 25% or more, 30% or more, 35% or more, 40% or more, or even 45% or more, and at the same time, 60% or less, 55% or less, or even 50% or less, structural units of the α, β-ethylenically unsaturated carboxylic acid. "Weight of the polymer A" in the present invention refers to dry weight or solids weight of the polymer A.

The polymer A in the multistage polymer may also comprise structural units of one or more monoethylenically unsaturated nonionic monomers (a2). As used herein, the term "nonionic monomers" refers to monomers that do not bear an ionic charge between pH=1-14. Suitable monoethylenically unsaturated nonionic monomers may include, for example, alkyl esters of (meth)acrylic acids, vinyl aromatic monomers such as styrene and substituted styrenes, vinyl esters of carboxylic acids, ethylenically unsaturated nitriles, or mixtures thereof. Preferably, the monoethylenically unsaturated nonionic monomer is a $C_1$-$C_{18}$, $C_2$-$C_{10}$, or $C_3$-$C_6$ alkyl esters of (meth)acrylic acid, for example, methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl(meth)acrylate, oleyl(meth)acrylate, palmityl (meth)acrylate, nonyl (meth)acrylate, decyl (meth)acrylate, dodecyl (meth)acrylate, pentadecyl (meth) acrylate, hexadecyl (meth)acrylate, octadecyl (meth)acrylate. More preferably, the monoethylenically unsaturated nonionic monomers are selected from the group consisting of methyl methacrylate, ethyl acrylate, butyl acrylate, and 2-ethylhexyl acrylate. The polymer A may comprise, by weight based on the weight of the polymer A, from 40% to 85%, from 45% to 80%, or from 50% to 70%, of structural units of the monoethylenically unsaturated nonionic monomers.

The polymer A in the multistage polymer may optionally comprise, by weight based on the weight of the polymer A, less than 0.1% of structural units of one or more hydrophobic associated monomers (a3). The hydrophobic associated monomers may have the structure of formula I:

$$H_2C=C(R)CO_2(CH_2CH_2O)_n(CH(R^1)CH_2O)_mR^2 \quad (I),$$

wherein R is H or $CH_3$, $R^1$ is a $C_1$-$C_2$ alkyl group, $R^2$ is an aralkyl phenyl group or a $C_8$-$C_{50}$ linear or branched alkyl group, n is an integer of from 6 to 100, from 10 to 60, or from 20 to 40, and m is an integer of from 0 to 50, provided that n≥m and m+n is from 6 to 100. m can be an integer of from 0 to 20, from 0 to 10, or from 0 to 5. Preferably, m is 0 and n is an integer from 10 to 60; and more preferably, m is 0 and n is an integer from 20 to 40. Preferred R is $CH_3$. $R^2$ may be an alkyl benzene substituted benzene group, preferably a $C_1$-$C_4$ alkyl benzene substituted benzene group, and more preferably an ethyl benzene substituted benzene group. Suitable hydrophobic associated monomers may include, for example, polyethoxy lauryl methacrylate (23 oxyethylene (EO) units), polyethoxy C13/C15 methacrylate (20EO), polyethoxy cetostearyl methacrylate (30EO), ceteth-20 methacrylate, behenyl polyethoxy methacrylate (30EO), polyethoxylated tristyryl phenol methacrylate (25EO), polyethoxy stearyl methacrylate (20EO), polyethoxy cetyl methacrylate (25EO), polyethoxy lauryl methacrylate (10EO), polyethoxy stearyl methacrylate (25EO), polyoxyethylene behenyl-tricosyl methacrylate, methacrylate ester of 20 mole ethoxylate of cetyl-stearyl alcohol, or mixtures thereof. The polymer A may comprise, by weight based on the weight of the polymer A, less than 0.1%, less than 0.09%, less than 0.08%, less than 0.07%, less than 0.06%, less than 0.05%, less than 0.04%, less than 0.03%, less than 0.02%, less than 0.01%, or even zero, of structural units of the hydrophobic associated monomer. In some embodiments, the polymer A is substantially free of structural units of the hydrophobic associated monomer, e.g., less than 0.02%, less than 0.01%, or even zero, based on the weight of the polymer A.

The polymer A in the multistage polymer may optionally comprise structural units of one or more crosslinkers selected from $C_3$-$C_{20}$ alkylene glycol di(meth)acrylates, poly(alkylene glycol) di(meth)acrylates, or combinations thereof. Preferably, the alkylene glycol di(meth)acrylate is a $C_3$-$C_{15}$ alkylene glycol di(meth)acrylate, and more preferably a $C_3$-$C_{10}$ alkylene glycol di(meth)acrylate. The poly (alkylene glycol) di(meth)acrylate useful in the present invention may include poly(ethylene glycol) di(meth)acrylate, poly(propylene glycol) di(meth)acrylate, poly(butylene glycol) di(meth)acrylate, or combinations thereof. The poly (alkylene glycol) di(meth)acrylate may comprise from 2 to 20, from 2 to 10, or from 2 to 8 alkylene oxide units. Examples of suitable crosslinkers include 1,3-butylene glycol dimethacrylate, 1,4-butanediol dimethacrylate, glycerol 1,3-dimethacrylate, diethylene glycol dimethacrylate, triethylene glycol dimethacrylate, tripropylene glycol dimethacrylate, 1,6-hexanediol di(meth)acrylate, neopentyl glycol di(meth)acrylate, 1,9-nonanediol di(meth)acrylate, propylene glycol diacrylate, 1,1,1-trimethylolpropane dimethacrylate, 1,1,1-trimethylolethane diacrylate, or mixtures thereof. The polymer A may comprise, by weight based on the weight of the polymer A, from 0 to 2%, from 0.01% to 1%, from 0.02% to 0.5%, or from 0.03% to 0.25%, of structural units of the crosslinker.

In some embodiments, the polymer A comprises, by weight based on the weight of the polymer A, (a1) from 20% to 60% of structural units of the α, β-ethylenically unsaturated carboxylic acid, (a2) from 40% to 80% of structural units of the monoethylenically unsaturated nonionic monomer, (a3) from 0 to 0.05% of structural units of the hydrophobic associated monomer, and (a4) from 0 to 0.25% of structural units of the crosslinker.

In some preferred embodiments, the polymer A in the multistage polymer consists of structural units of the α, β-ethylenically unsaturated carboxylic acid, the monoethylenically unsaturated nonionic monomer, and optionally the crosslinker.

The multistage polymer useful in the present invention further comprises the polymer B that is different from the polymer A. The polymer B may comprise structural units of one or more α, β-ethylenically unsaturated carboxylic acid (b1), which can be selected from the same group (a1) as described above in the polymer A section. The polymer B may comprise, by weight based on the weight of the polymer B, 15% or more, 20% or more, 25% or more, 30% or more, 35% or more, 40% or more, or even 45% or more, and at the same time, 60% or less, 55% or less, or even 50% or less, structural units of the α, β-ethylenically unsaturated carboxylic acids. "Weight of the polymer B" in the present invention refers to dry weight or solids weight of the polymer B.

The polymer B in the multistage polymer may also comprise structural units of one or more monoethylenically unsaturated nonionic monomers (b2), which can be selected from the same group (a2) as described above in the polymer A section. The polymer B may comprise, by weight based on the weight of the polymer B, 5% or more, 10% or more, 20% or more, 25% or more, 30% or more, 35% or more, or even 40% or more, and at the same time, 84% or less, 80% or less, 75% or less, 70% or less, or even 65% or less, of structural units of the monoethylenically unsaturated nonionic monomers.

The polymer B in the multistage polymer may further comprise structural units of one or more hydrophobic associated monomers (b3), which can be selected from the same group (a3) as described above in the polymer A section. The polymer B may comprise, by weight based on the weight of the polymer B, 0.1% or more, 0.5% or more, 1% or more, 1.5% or more, 2% or more, 3% or more, 4% or more, or even 5% or more, and at the same time, 60% or less, 50% or less, 40% or less, 30% or less, 20% or less, 15% or less, 10% or less, or even 8% or less, of structural units of the hydrophobic associated monomer.

The polymer B in the multistage polymer may comprise structural units of one or more crosslinkers (b4), which can be selected from the same group (a4) as described above in the polymer A section. The polymer B may comprise, by weight based on the weight of the polymer B, from 0.01% to 20%, from 0.02% to 15%, from 0.03% to 10%, from 0.05% to 5%, or from 0.1% to 2%, of structural units of the crosslinker.

In some embodiments, the polymer B comprises, by weight based on the weight of the polymer B, (b1) from 20% to 60% of structural units of the α, β-ethylenically unsaturated carboxylic acid, (b2) from 35% to 75% of structural units of the monoethylenically unsaturated nonionic monomer, (b3) from 0.1% to 30% of structural units of the hydrophobic associated monomer, and (b4) from 0.01% to 2% of structural units of the crosslinker.

The weight ratio of the polymer A to the polymer B in the multistage polymer may be in the range of from 95:5 to 55:45, from 94:6 to 56:44, from 92:8 to 58:42, from 91:9 to 59:41, from 90:10 to 60:40, from 85:15 to 65:35, or from 80:20 to 70:30.

The multistage polymer useful in the present invention may further comprise structural units of one or more monoethylenically unsaturated monomers carrying at least one functional group selected from a carbonyl, sulfonate, phosphate, hydroxyl, amide, or ureido group, in polymer A, in the polymer B, or in both polymer A and polymer B. Suitable monoethylenically unsaturated monomers carrying at least one functional group may include, for example, diacetone (meth)acrylamide (DAAM), acetoacetoxyethyl methacrylate (AAEM), acrylamide, methacrylamide, sodium styrene sulfonate (SSS), sodium vinyl sulfonate (SVS), 2-phosphoethyl (meth)acrylate, 2-hydroxyethyl acrylate, or mixtures thereof. The multistage polymer may comprise from 0 to 20%, from 1% to 10%, or from 2% to 5%, of structural units of the functional-group-containing monoethylenically unsaturated monomers, by weight based on the weight of the multistage polymer, e.g., total weight of the polymer A and the polymer B. "Weight of the multistage polymer" in the present invention refers to dry weight or solids weight of the multistage polymer.

In some preferred embodiments, the multistage polymer in the HASE thickener composition comprises:

(A) the polymer A comprising, by weight based on the weight of the polymer A, (a1) from 20% to 60% of structural units of the α, β-ethylenically unsaturated carboxylic acid, (a2) from 40% to 80% of structural units of the (meth)acrylic acid alkyl ester, (a3) less than 0.05% of structural units of the hydrophobic associated monomer, and optionally (a4) from 0 to 0.25% of structural units of the crosslinker; and (B) the polymer B comprising, by weight based on the weight of the polymer B, (b1) from 20% to 60% of structural units of the α, β-ethylenically unsaturated carboxylic acid, (b2) from 40% to 80% of structural units of the (meth) acrylic acid alkyl ester, (b3) from 1% to 10% of structural units of the hydrophobic associated monomer, and (b4) from 0.01% to 2% by weight of structural units of the crosslinker;

wherein the weight ratio of the polymer A to the polymer B is from 90:10 to 60:40.

The multistage polymer useful in the present invention may have a weight average molecular weight of 30,000 daltons or more, 200,000 daltons or more, 600,000 daltons or more, 700,000 daltons or more, 800,000 daltons or more, 900,000 daltons or more, or even 1,000,000 daltons or more, and at the same time, 10,000,000 daltons or less, 9,200,000 daltons or less, 9,100,000 daltons or less, 9,000,000 daltons or less, 8,000,000 daltons or less, 7,000,000 daltons or less, 6,000,000 daltons or less, 5,000,000 daltons or less, 4,000,000 daltons or less, 3,500,000 daltons or less, or even 3,000,000 daltons or less. The molecular weight herein may be characterized using Asymmetric Flow Field Flow Fractionation with on-line Multi Angle Light Scattering (MALS) and differential Refractive Index detectors, according to the test method described in the Examples section below.

The types and levels of the monomers described above may be chosen to provide the multistage polymer with a $T_g$ suitable for different applications. For example, the polymer A may have a Tg of from 5 to 80° C., from 10 to 70° C., or from 15 to 60° C. The polymer B may have a $T_g$ of from 5 to 120° C., from 10 to 100° C., or from 15 to 80° C. The $T_g$ of the multistage polymer may be in the range of from 5 to 100° C., from 10 to 80° C., or from 15 to 60° C. The multistage polymer may be present in the aqueous dispersion in the form of multistage polymeric particles having a number average particle size particle size of from 70 nanometers (nm) to 300 nm, from 80 nm to 200 nm, from 90 nm to 150 nm, or from 100 nm to 120 nm as measured by Brookhaven BI-90 Particle Size Analyzer.

The multistage polymer useful in the present invention may be present in an amount of from 10% to 70% by dry weight based on the total weight of the aqueous HASE thickener composition, for example, 15% or more, 20% or more, 25% or more, or even 30% or more, and at the same time, 65% or less, 60% or less, 55% or less, 50% or less, 45% or less, or even 40% or less. The aqueous HASE thickener composition dispersion further comprises water.

The multistage polymer in the aqueous HASE thickener composition may be prepared by multistage free-radical polymerization in which at least two stages are formed sequentially, which usually results in the formation of the multistage polymer comprising at least two polymer compositions such as the polymer A in the first stage and the polymer B in the second stage. In preparing the multistage polymer particles, the polymer A can be polymerized first and subsequently the second polymer is polymerized in the presence of the polymer A. Each stage of the multistage free-radical polymerization can be conducted by polymerization techniques well known in the art such as suspension polymerization or emulsion polymerization of the monomers described above. Emulsion polymerization is a preferred process. The polymer A can be polymerized from a first monomer mixture comprising the α, β-ethylenically unsaturated carboxylic acid (a1), the monoethylenically unsaturated nonionic monomer (a2), and optionally, the hydrophobic associated monomer (a3) and/or the multiethylenically unsaturated crosslinker (a4). Then, the polymer B may be polymerized from a second monomer mixture comprising the α, β-ethylenically unsaturated carboxylic acid (b1), the monoethylenically unsaturated nonionic monomer (b2), the hydrophobic associated monomer (b3), and the crosslinker (b4). The dosage of each monomer, based on the weight of the first monomer mixture, in the first monomer mixture for preparing the polymer A may be substantially the same as the content of the structural units of such monomer in the polymer A as described above. The same applies to the dosage of each monomer in the second monomer mixture for preparing the polymer B. Total weight concentration of monomers for preparing the polymer A and the polymer B, respectively, is equal to 100%. The first monomer mixture and/or the second monomer mixture may be added as an emulsion in water; or added in one or more additions or continuously, linearly or nonlinearly, over the reaction period of preparing the polymer A or the polymer B, or combinations thereof. Temperature suitable for emulsion polymerization processes may be lower than 100° C., for example, in the range of from 30 to 95° C., or in the range of from 50 to 90° C.

In the multistage free-radical polymerization process, free radical initiators may be used in the stage of preparing the polymer A, in the stage of preparing the polymer B, or in both stages. The multistage free-radical polymerization process may be thermally initiated or redox initiated emulsion polymerization in each stage. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the multistage free-radical polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used in the stage of preparing the polymer A, in the stage of preparing the polymer B, or in both stages. The surfactant may be added prior to or during the polymerization of the monomers, or combinations thereof. A portion of the surfactant can also be added after the polymerization. Surfactants may be used for both stages. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the surfactants used is usually from 0.1% to 10% by weight or from 1% to 5% by weight, based on the weight of total monomers used for preparing the multistage polymer.

In the multistage free-radical polymerization process, a train transfer agent may be used in the stage of preparing the polymer A, in the stage of preparing the polymer B, or in both stages. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the multistage polymer. The chain transfer agent may be present in an amount of from 0 to 3%, from 0.01% to 2%, or from 0.05% to 1%, by weight based on the total weight of monomers used for preparing the multistage polymer.

The obtained aqueous dispersion of the multistage polymer may have a pH value of from 0.5 to 5.0, from 1.0 to 4.5, or from 1.5 to 4.0. The aqueous multistage polymer dispersion may have a viscosity of from 1 to 200 centipoises (cps), from 3 to 100 cps, or from 5 to 50 cps as measured by a Brookfield viscometer at a shear rate of 60 rpm with spindle #2 at room temperature (20-30° C.). The multistage polymer may become water soluble upon neutralization. The polymer A, the polymer B, and the resultant multistage polymer can be alkali-soluble. "Alkali-soluble" means that a polymer is substantially soluble in an aqueous medium which has been adjusted with alkali to a pH of about 5.0 or greater at room temperature. "Alkali-swellable" means that a polymer is substantially swellable in an aqueous medium which has been adjusted with alkali to a pH of about 5.0 or greater at room temperature. Neutralization can be conducted by adding one or more bases into the aqueous dispersion. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The aqueous thickener blend composition of the present invention further comprises an acid-suppressible associative thickener composition. Suitable acid-suppressible associative thickener composition may include those associative thickeners described in U.S. Pat. Nos. 7,741,401, 7,741,402 and 9,790,345. The acid-suppressible associative thickener composition useful in the present invention comprises an acid-suppressible associative thickener. The acid-suppressible associative thickener may have a backbone comprising a polyoxyalkylene, a polysaccharide, or a polyvinyl alcohol, said acid-suppressible associative thickener further comprising a plurality of hydrophobic groups attached to or within the backbone wherein one or more of said hydrophobic groups comprises a secondary amine, a tertiary amine, a tertiary phosphine, or a combination thereof, and optionally a quaternary amine, with the proviso that less than 80% of the total amine functionality is a quaternary amine. The secondary amine, tertiary amine, and tertiary phosphine are defined herein such that the carbon atoms adjacent to nitrogen or phosphorus are not classified as carbonyl or thionyl carbons. The term "attached to or within the backbone" of the thickener means these hydrophobic groups may be located within the backbone, pendant to the backbone and/or on chain termini. The term "hydrophobic group" means a group chosen from radicals and polymeric groups comprising at least one hydrocarbon-based chain chosen from linear and branched, saturated and unsaturated hydrocarbon-based chains, which optionally comprise one or more hetero atom, such as P, O, N and S, and radicals comprising at least one chain chosen from perfluoro and silicone chains. When the term "hydrophobic group" means a group chosen from the hydrocarbon radicals, the hydrophobic group comprises at least 6 carbon atoms, preferably 10 to 24 carbon atoms. Preferably, the associative thickener has a non-ionic water soluble backbone. Herein, a water soluble backbone is soluble in water under acidic, neutral and basic conditions, preferably pH=3 to pH-10. The backbone may have a solubility in water at 25° C. of at least 10% by weight.

Preferably, the acid-suppressible associative thickener has a backbone comprising one or more polyoxyalkylene segments greater than 10 oxyalkylene units in length. As used herein, the term "oxyalkylene" refers to units having the structure —(O-A)—, wherein O-A represents the monomeric residue of the polymerization reaction product of a $C_{2-8}$ alkylene oxides. Examples of oxy-alkylenes include, but are not limited to: oxyethylene with the structure —(OCH$_2$CH$_2$)—; oxypropylene with the structure —(OCH(CH$_3$)CH$_2$—; oxytrimethylene with the structure —(OCH$_2$CH$_2$CH$_2$)—; and oxybutylene with the general structure —(OC$_4$H$_8$)—. Polymers containing these units are referred to as "polyoxyalkylenes." The polyoxyalkylene units can be homopolymeric or copolymeric. The backbone of the acid-suppressible associative thickener may further comprise one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

The acid-suppressible associative thickener may have a backbone comprising one or more polyoxy-alkylene segments greater than 10 oxyalkylene units in length and is a hydrophobically modified polyurethane polyether comprising the reaction product of a dialkylamino alkanol with a multi-functional isocyanate, a polyether diol, and optionally a polyether triol. Preferably, the polyether diol has a weight average molecular weight between 2,000 and 12,000, preferably between 6,000 and 10,000, as measured according by size exclusion chromatography (SEC) described in the Examples section below.

The acid-suppressible associative thickener useful in the present invention may have a backbone comprising one or more polyoxyalkylene segments greater than 10 oxyalkylene units in length and is a hydrophobically modified polyurethane polyether comprising the reaction product of an epoxy-amine adduct with a multi-functional isocyanate, and a polyether diol, said epoxy-amine adduct derived from the reaction of primary or secondary amines with mono- or di-glycidyl ether derivatives or other mono- or di-epoxy derivatives. Preferably, the polyether diol has a weight average molecular weight between 2,000 and 12,000, preferably between 6,000 and 10,000, as measured by SEC described in the Examples section below.

The acid-suppressible associative thickener composition can be formulated to contain a wide range of solids content. For example, the aqueous associative thickener composition may comprise from 1% to 60% thickener solids, specifically from 5% to 40% thickener solids, or from 15% to 25% thickener solids, by weight based on the total weight of the aqueous associative thickener composition.

The acid-suppressible thickener composition useful in the present invention further comprises sufficient acid to substantially protonate the secondary amine or the tertiary amine, or the tertiary phosphine, or combination thereof. Organic or inorganic acids can be used for protonating the amine functionality in the acid-suppressible associative thickener. Suitable acids may include, for example, phosphoric acid, acetic acid, hydrochloric acid, Sulfuric acid, citric acid, carbonic acid, ascorbic acid, glycolic acid, isoascorbic acid, adipic acid, Succinic acid, oxalic acid, homopolymers and copolymers of acrylic acid, homopolymers and copolymers of methacrylic acid, homopolymers and copolymers of maleic anhydride, homopolymers and copolymers of styrene sulphonate, homopolymers and copolymers of 2-acrylamido-2-methylpropane sulfonic acid, polyphosphoric acid, homopolymers and copolymers of phosphoethylmethacrylate, alpha hydroxy acids and trans-cinnamic acid. Phosphoric acid and polyacrylic acid with a molecular weight between 1000 and 5000 are preferred. The acid can be present in an amount that is sufficient to adjust the pH of the aqueous thickener composition to a pH of 2.5 to 6.0.

The acid-suppressible associative thickener composition useful in the present invention may further comprise from 40% to 99%, from 60% to 95%, or from 75% to 85% of water, by weight based on the total weight of the aqueous associative thickener compositions.

The acid-suppressible thickener composition useful in the present invention may further comprise other optional additives useful to decrease the viscosity of the composition. Suitable viscosity suppressing additives may include, for example, organic co-solvents such as diethylene glycol monobutyl ether, triethylene glycol monobutyl ether, ethylene glycol, polyethylene glycol, propylene glycol polypropylene glycol, or mixtures thereof; surfactants such as dialkylsulfosuccinates, sodium lauryl sulfate, alkyl ethoxylates and alkylarylethoxylates; cyclodextrin compounds such as cyclodextrin (which includes α-cyclodextrin, β-cyclodextrin, and γ-cyclodextrin), cyclodextrin derivatives, cycloinulohexose, cycloinulohep-tose, cycloinulo-octose, calyxarene, and cavitand. "Cyclodextrin derivatives" refer to α-cyclodextrins, β-cyclodextrins, and γ-cyclodextrins in which at least one hydroxyl group located on the rim of the cyclodextrin ring has been functionalized with a substituent group such as methyl, acetyl, hydroxypropyl, hydroxyethyl group. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin, in particular methyl-β-cyclodextrin. These optional additives may be present in an amount of zero to 15%, from 1% to 10%, or from 1% to 3%, by weight based on the total weight of the aqueous associative thickener compositions.

The dry weight ratio of the multistage polymer to the acid-suppressible associative thickener in the aqueous thickener blend composition may be in the range of from 99:1 to 65:35, from 98.5:1.5 to 70:30, from 98:2 to 75:25, from 97.5:2.5 to 80:20, from 97:3 to 85:15, from 96.5:3.5 to 90:10, or from 96.5:3.5 to 95:5; preferably from 97.5:2.5 to 90:10, and more preferably, from 97.5:2.5 to 95:5.

The aqueous thickener blend composition of the present invention is useful in many applications including, for example, wood coatings, architecture coatings, and traffic paints. The aqueous thickener blend composition can demonstrate satisfactory thickening efficiency.

"Satisfactory thickening efficiency" herein refers to the dry dosage of a thickener in an aqueous coating composition less than 10 grams (g), preferably less than 5 g, in 1 kilogram (kg) of the aqueous coating composition to afford a viscosity of 100 KU, as measured according to the test method described in the Examples section below.

The present invention also relates to an aqueous coating composition, e.g., a paint formulation, comprising the aqueous thickener blend composition described above. When used in the aqueous coating composition, the aqueous thickener blend composition is typically neutralized to a high pH value, for example, 8 or higher, or even 8.5 or higher. The aqueous coating composition may comprise, by dry weight based on the total dry weight of the aqueous coating composition, from 0.1% to 5%, from 0.2% to 2%, or from 0.3% to 1%, of the aqueous thickener blend composition.

The aqueous coating composition of the present invention may further comprise one or more binders that are different from the multistage polymer described above. The binder typically comprises, based on the weight of the binder, 10% or less, 5% or less, 2% or less of structural units of one or more α, β-ethylenically unsaturated carboxylic acids. The α, β-ethylenically unsaturated carboxylic acid constituting structural units of the binder, i.e., used in synthesis of the binder, can be selected from the same group as described above in the polymer A section. The binder can be an acrylic emulsion polymer (for example, pure acrylic emulsion polymer, styrene acrylic emulsion polymer, or mixtures thereof), vinyl acetate-ethylene emulsion polymer, vinyl acetate emulsion polymer, or mixtures thereof. In one embodiment, the binder used is an acrylic emulsion polymer. "Acrylic emulsion polymer" herein refers to an emulsion polymer comprising structural units of one or more acrylic monomers or their mixtures with other monomers including, for example, styrene or substituted styrene. The binders may have a weight average molecular weight of 50,000 daltons or more, for example, from 50,000 to 1,000,000 daltons, or from 100,000 to 200,000 daltons, as measured by gel permeation chromatography (GPC) analysis (Columns: PLgel Guard Column (10 μm, 50 mm×7.5 mm) and PLgel MIXED GEL B (10 μm); column temperature: 40° C.; mobile phase: THF/FA (5%); flow rate: 1.0 mL/minute; injection volume: 100 mL; detector: Agilent Refractive Index detector, 40° C.; and calibration curve: PL Polystyrene Narrow standards with molecular weights ranging from 2,329,000 to 580 g/mol, using polynom 3 fitness). The aqueous coating composition of the present invention may comprise, by dry weight based on the total dry weight of the aqueous coating composition, from 3% to 75%, from 10% to 60%, or from 20% to 50%, of the binder.

The aqueous coating composition of the present invention may further comprise pigments to form pigmented coating compositions (also known as "paint formulations"). "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form. The aqueous coating composition may also comprise one or more extenders. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers, or mixtures thereof. The aqueous coating composition may have a pigment volume concentration (PVC) of from 10% to 98%, from 15% to 90%, or from 20% to 80%. PVC may be determined according to the following equation: PVC $\%=[Volume_{(Pigment+Extender)}/Volume_{(Pigment+Extender+Binder)}]\times 100\%$.

The aqueous coating composition of the present invention may also comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The molecular weight of such polyacids may be in the range of from 1,000 to 20,000 daltons, from 1,200 to 10,000 daltons, or from 1,500 to 8,000 daltons as measured by GPC analysis (column: One PLgel GUARD columns (10 µm, 50×7.5 mm) and One Mixed B columns (7.8×300 mm) in tandem; and calibration: PL Polystyrene Narrow standards with molecular weights ranging from 2329000 to 580 g/mol, using polynom 3). The dispersants may be used in pigment grinding stage or letdown stage of making coating compositions. The dispersants may be present, by weight based on the total weight of the aqueous coating composition, in an amount of from 0 to 5% by weight, from 0.2% to 3%, or from 0.3% to 2%.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The concentration of the defoamer may be, by weight based on the total dry weight of the aqueous coating composition, generally from 0 to 1%, from 0.05% to 0.8%, or from 0.1% to 0.5%.

The aqueous coating composition of the present invention may further comprise one or more additional thickeners that are different from the aqueous thickener blend composition of the present invention. The additional thickeners may include cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose, and other additional thickeners, e.g., polyvinyl alcohol (PVA), clay materials, or mixtures thereof. The additional thickener may be present, by weight based on the total dry weight of the aqueous coating composition, generally in an amount of from zero to 5%, from 0.1% to 3%, or from 0.2% to 1%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The wetting agent may be present, by weight based on the total dry weight of the aqueous coating composition, in an amount of from zero to 2.5%, from 0.5% to 2%, or from 1% to 1.5%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The coalescent may be present, by weight based on the total dry weight of the aqueous coating composition, in an amount of from zero to 5%, from 1% to 4%, or from 2% to 3%.

In addition to the components described above, the aqueous coating composition of the present invention may further comprise any one or combination of the following additives: buffers, neutralizers, freeze/thaw additives, humectants, mildewcides, biocides, anti-skinning agents, colorants, flowing agents, anti-oxidants, plasticizers, leveling agents, thixotropic agents, adhesion promoters, and grind vehicles. These additives may be present in a combined amount of from zero to 5%, from 1% to 4%, or from 2% to 3%, by weight based on the total weight of the aqueous coating composition.

The aqueous coating composition of the present invention may be prepared by admixing the aqueous thickener blend composition, the binder and other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises the pigment and/or extender, that is, a pigment formulation, the pigments and/or extenders are preferably mixed with the dispersant to form a slurry of pigments and/or extender.

The aqueous coating composition of the present invention has good heat-age stability. "Good heat-age stability" herein refers to a viscosity change within ±10 KU units after heat aging the aqueous coating composition at 50° C. for 7 days or more, 14 days or more, 21 days or more, or even 28 days or more, as measured according to the test method described in the Examples section below. The aqueous coating composition comprising the aqueous thickener blend composition of the present invention may also have better color stability as compared to aqueous coating compositions comprising blends of conventional HASE thickeners with the acid-suppressible associative thickener.

The present invention also relates to a process of using the aqueous coating composition, comprising the following: applying the aqueous coating composition to a substrate, and drying, or allowing to dry, the applied aqueous coating composition.

The present invention also provides a method of preparing a coating. The method may comprise: forming the aqueous coating composition of the present invention, applying the aqueous coating composition to a substrate, and drying, or allowing to dry, the applied aqueous coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine and protective coatings, automotive coatings, traffic paint, Exterior Insulation and Finish Systems, roof mastic, wood coatings, coil coatings, plastic coatings, powder coatings, can coatings, architectural coatings, and civil engineering coatings. The coating composition is particularly suitable for architectural coatings. The aqueous coating composition can be used alone, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 35° C. to 60° C.

EXAMPLES

Some embodiments of the invention will now be described in the following Examples, wherein all parts and percentages are by weight unless otherwise specified. The following materials are used in the examples:

AMP-95 2-methyl-2-amino-propanol, OROTAN™ 1288 Dispersant, PRIMAL™ AS-356 Binder, ROPAQUE™ Ultra E polymer, and TRITON™ CF-10 surfactant are all available from The Dow Chemical Company (PRIMAL, OROTAN and TRITON are all trademarks of The Dow Chemical Company).

DISPONIL Fes-32 ("Fes-32") surfactant and Foamaster NXZ defoamer are available from BASF Global Corporation.

PCSM Polyethoxy cetyl-stearyl methacrylate with 20 EO (PCSM) is available from Kal-Gard.

ACRYSOL DR-180 thickener, available from The Dow Chemical Company, is a linear HASE thickener prepared by one-stage emulsion polymerization.

ACRYSOL TT-935 thickener (30% solids), available from The Dow Chemical Company, is a linear HASE thickener prepared by one-stage emulsion polymerization.

ACRYSOL RM-998 thickener (25% solids and 20% active component), available from The Dow Chemical Company, comprises 20% by weight of an acid suppressed HEUR thickener.

The following standard analytical equipment and methods are used in the Examples.

Heat-Age Stability Test

A paint formulation (200 grams (g)) was put into a plastic bottle, and then an initial viscosity (Krebs Units (KU) as units) of the paint formulation was recorded at room temperature. The paint formulation was then stored in an oven at 50° C. for 7 days, 14 days, 21 days, or 28 days, respectively. The viscosity of the paint formulation after storage was tested and recorded as heat-aged viscosity. The difference between the initial viscosity and the heat-aged viscosity is defined as the heat-age viscosity change (i.e., AKU after heat aging). A heat-age viscosity change within ±10 KU indicates acceptable heat-age stability. The smaller heat-age viscosity change, the better heat-age stability.

Color Float Stability

Phthalo blue colorant (4 g) was added to a paint formulation (200 g) and mixed well (for example, using a paint shaker for 5 minutes) to get a uniform tinted paint. The color float stability after addition of the colorant was visually observed by the appearance of colorants in the paint surface. The darker the color appearance, the poorer color float stability after addition of colorants. The score from 0-10 is given to evaluate the color float stability with 10 is the best. The color float stability score of 8 or higher after storage for 1 month is acceptable. Otherwise, the color float stability score below 8 is not acceptable. The color change of the surface of the paint formulation was observed by the naked eye and scores of color float stability are rated based on the criteria below:

| Score | Color float stability criteria |
| --- | --- |
| 10 | After storage, no any color change |
| 9 | After storage, the whole paint surface shows slight color change, but no phthalo blue colorant floats on the surface. |
| 8 | After storage, the whole paint surface becomes a little dark blue color, but no phthalo blue colorant floats on the surface. |
| 4 | After storage, obvious phthalo blue colorant domain is observed on the surface. |
| 0 | After storage, the whole paint surface has very dark blue color, which means the phthalo blue colorant floats on all the paint surface. |

Thickening Efficiency

Each paint formulation was thickened to target a viscosity of 100 KU. Thickening efficiency was determined as the solids (i.e., dry weight) of a thickener in gram per 1 kilograms (kg) of the paint formulation that would have been required to reach the target KU about 100, and recorded as g/kg in Table 3.

When evaluating the heat-age stability and the thickening efficiency, the viscosity of paint formulations was measured by a Stormer viscometer at a medium shear rate (80~100 rpm) according to ASTM (American Society for Testing and Materials) D562-10(2014) method.

Molecular Weight of Multistage Polymers Measurement

The phrase "molecular weight" refers to the weight average molecular weight as measured using asymmetric flow field flow fractionation (AF4) with inline Multi-Angle Light Scattering (MALS) and differential Refractive Index detections. The AF4 instrument used consisted of an Eclipse DualTec separation system (from Wyatt Technology Corp.) that was coupled in series to an 18 angle multi angle light scattering (MALS) detector (DAWN HELOS II; from Wyatt Technology Corp.) and a differential refractometer (Optilab rEX; from Wyatt Technology Corp.). Flows through the AF4 instrument were provided using an Agilent Technologies 1200 series isocratic pump equipped with a micro-vacuum degas ser. All injections were performed with an auto sampler (Agilent Technologies 1200 series). Data from the AF4 instrument were collected and processed using Astra software version 7.0.1.23 (from Wyatt Technology Corp.). Samples were prepared at a concentration of 1 mg/mL in 20 mM ammonium acetate solution at pH 10 (filtered with a 1.2 μm pore nylon membrane). Samples (25 μL) were injected into the standard separation channel system (25 cm long and a width dimension starting at 2.15 cm and reducing to 0.3 cm over the length) with a channel thickness of 350 μm and equipped with a 10 kDa cutoff regenerated cellulose ultra-filtration membrane (Wyatt Technology). The mobile phase used for AF4 analysis was 20 mM ammonium acetate solution at pH 10. Separation was performed with an applied channel flow of 1 mL/min. The sample was introduced to the channel with focus flow at 1.7 mL/min for 3 minutes. The elution flow started at 0.5 mL/min for 3 minutes and then followed by a linearly decreasing cross flow gradient (from 0.5 mL/min to 0.05 mL/min over 12 minutes), then held at 0.05 mL/min for another 5 minutes. The average molecular weight was calculated using Astra software version 7.0.1.23 after subtracting a blank injection with a refractive index increment (dn/dc) of 0.185 mL/g for all calculation with Berry model $2^{nd}$ order fit using the detectors at Refractive Index Corrected Scattering Angle ranged from 13.0° to 70.1°. Molecular weights are reported herein in units of daltons.

Molecular Weight of Polyether Diols Measurement

SEC was carried out for polyether diol samples as follows:

a) Sample Preparation: Samples were prepared in 100 mM $NH_4Ac$ in MeOH (Optima grade from Fisher) at concentration of about 2 mg/g. Samples were brought into solution by shaking on the mechanical shaker overnight at ambient temperature. Sample solutions were filtered using 0.45 μm PTFE filters. Samples appeared to be soluble (checked visually) and no resistance was observed during filtration process.

b) SEC set-up and separation conditions: Separations were carried out on a liquid chromatograph consisting of an Agilent 1100 Model isocratic pump and injector (Waldbronn, Germany) and Waters 2414 Model differential refractometer (Milford, Mass.) operated at 40° C. System control, data acquisition and data processing were performed using Cirrus® software version 3.1 (Polymer Laboratories, Church Stretton, UK).

The calibration curve was generated using polyethylene oxide standards with the following: $M_p$s: 615, 1500, 3930, 12140, 23520, 62100, 116300, 442800, 909500 and 1258000. The polydispersities of these standards ranged from about 1.04 to 1.16. The standards were obtained commercially from Polymer Laboratories, part of Agilent, part #PL2080-0201.

SEC separations were performed with a mobile phase of 100 mM $NH_4Ac$ in MeOH (Optima grade from Fisher) @ 1 mL/min. The SEC column set used in this study was composed of three Asahipak columns (300×7.5 mm ID) packed with highly cross-linked polar gel. The column pore size was identified as: GF-310HQ, GF-510HQ and GF-710HQ, the particle size was 9 μm and the columns were purchased from Shoko America (Torrance, Calif.).

Synthesis of HASE IS-1

First, two monomer emulsions (ME1 and ME2) were prepared. ME1 was prepared by mixing deionized (DI) water (289.5 g), 32% Fes-32 (11.1 g), ethyl acrylate (EA) (263.11 g) and glacial methacrylic acid (GMAA) (175.4 g, The Dow Chemical Company). ME2 was prepared by mixing DI water (124.06 g), 32% Fes-32 (4.75 g), ethyl acrylate (100.44 g), glacial methacrylic acid (71.74 g), PCSM (17.94 g) and 1,3-Butanediol dimethacrylate (BGDMA) (0.19 g, Solvay Company). In a one gallon reactor with a mechanical stirrer, a condenser, a thermometer and a nitrogen purging line, DI water (540 g) and 32% Fes-32 (17.9 g) were added. When the reactor temperature was increased up to 86° C., an initiator solution of ammonium persulfate (APS) (0.7 g) dissolved in DI water (8 g) was added into the reactor. After 2 minutes, ME1 and 0.7% APS solution (28 g) were gradually added into the reactor over 77 minutes at 86° C. After completion of the ME1 and the initiator feed for ME1, the ME2 and 0.7% APS solution (12 g) were added into the reactor. After all the ME2 and the initiator feed for ME2 were finished, the reactor was held at 86° C. for 15 minutes and then 0.2% $FeSO_4·7H_2O$ solution (13.53 g) was added followed by 4% isoascorbic acid (IAA) solution (15 g) and 2% tert-butyl hydroperoxide (t-BHP) solution (15 g) twice. Then, the reactor was cooled and the resultant emulsion was filtered to get the HASE IS-1 with 30% solids. The obtained IS-1 thickener had a weight average molecular weight of 3,000,000 daltons.

Synthesis of HASE IS-9 and IS-11

The HASE IS-9 and IS-11 were prepared based on the same procedure as described in synthesis of IS-1 above, except that the monomer compositions were different and are given in Table 1. Properties of the above obtained thickeners are also given in Table 1.

TABLE 1

| HASE Thickener Composition | | | |
|---|---|---|---|
| Thickener | IS-1 | IS-9 | IS-11 |
| | Composition and two-stage emulsion polymerization | | |
| M1 (First stage)[1] | 60EA/ 40GMAA | 59.9EA/ 40GMAA/0.1 1,4-BDDMA | 60EA/ 40GMAA |
| M2 (Second stage)[2] | 53.32EA/ 40GMAA/6.67 PCSM/ 0.1BGDMA | 53.32EA/ 40GMAA/6.67 PCSM/0.1 1,4-BDDMA | 54.92EA/ 40GMAA/5 PCSM/ 0.08BGDMA |
| Weight ratio (M1/M2) | 70/30 | 70/30 | 60/40 |
| | Properties | | |
| pH | 4.47 | 3.96 | 2.92 |
| Solids, % | 30.56 | 30.93 | 30.17 |
| Viscosity[3] | 7.2 | 9.5 | 8 |
| Particle size (nm) | 77 | 93 | 130 |

[1]% by weight based on the weight of total monomers in M1;
[2]% by weight based on the weight of total monomers in M2;
[3]Viscosity was measured by a Brookfield viscometer at a shear rate of 60 rpm with spindle #2 at room temperature;
BDDMA: 1,4-butanediol dimethacrylate from Solvay Company.

Example (Ex) 1 Thickener Blend

The above obtained HASE IS-1 (51 g) was mixed with a HEUR solution (2 g RM-998 dissolved in 14 g DI water) at a dry/dry weight ratio of HASE to HEUR of 97.5/2.5. The resultant mixture was filtered by a 150 μm sieve to give the blend of Ex 1 (24% solids).

Ex 2 Thickener Blend

The above obtained HASE IS-1 (64.14 g) was mixed a HEUR solution (2 g RM-998 dissolved in 14 g DI water) at a dry/dry weight ratio of HASE to HEUR of 98/2. The resultant mixture was filtered by a 150 μm sieve to give the blend of Ex 2 (25.08% solids).

Comparative (Comp) Ex A Thickener Blend

ACRYSOL DR-180 (44.57 g) was mixed with a HEUR solution (2 g RM-998 dissolved in 14 g DI water) at a ratio of HASE to HEUR of 97.5/2.5. The resultant mixture was filtered to give the blend of Comp Ex A (26.58% solids).
Paint Formulations The paint formulations of IP-1 to IP-7 and comparative paint formulations of CP-A to CP-C were prepared according to the following procedure:

Grind Phase: water (150 g), AMP-95 (1.05 g), propylene glycol (20 g), OROTAN 1288 (7.88 g), Kathon LXE (1.05 g, Nopco), TRITON CF-10 wetting agent (2.12 g), Foamaster NXZ defoamer (1.05 g), Ti-Pure R-902 TiO$_2$ (90.31 g, DuPont), CC-700 extender (305.29 g, calcium carbonate from Guangfu Building Materials Group, China), and DB-80 extender (77.19 g, Calcined kaolin from Shanxi Jinyang Calcined Kaolin Ltd., China) were added into a tank sequentially and stirred with a high speed COWLES mixer. The grind phase components were then well dispersed.

Letdown Phase: After the grind phase, the COWLES mixer was replaced with a low-shear conventional lab mixer. PRIMAL AS-356 binder (107 g), Texanol coalescent (4.82 g, Eastman Chemical Company), ROPAQUE Ultra E opaque polymer (30 g), Foamaster NXZ defoamer (0.5 g), AMP-95 (0.6 g), and DI water (151.14 g) were then added to the tank and stirred at low speed dispersion to give a premix.

Then, the thickeners to be tested were added to the premix, followed by DI water, to adjust each paint formulation to a total amount of 1,000 g and a viscosity of 100 KU. When preparing the paint formulations of IP-1, IP-2, and CP-A, the as prepared thickener blends were used. When preparing other paint formulations, the specific HASE thickener was mixed with RM-998 HEUR thickener first and then added to the premix. Types and dosage of thickeners blends used in the paint formulations are given in Table 2.

TABLE 2

Thickener blends in paint formulations

| Paint formulation | Thickener blend (dosage) |
|---|---|
| IP-1 | Ex 1 thickener blend (15.34 g) |
| IP-2 | Ex 2 thickener blend (14.39 g) |
| IP-3 | IS-1 (10.21 g) and RM-998 (1.73 g) |
| IP-4 | IS-1 (9.62 g) and RM-998 (3.67 g) |
| IP-5 | IS-1 (4.65 g) and RM-998 (3.05 g) |
| IP-6 | IS-9 (12.77 g) and RM-998 (2.19 g) |
| IP-7 | IS-11 (9.73 g) and RM-998 (1.63 g) |
| CP-A | Comp Ex A thickener blend (7.26 g) |
| CP-B | DR-180 (5.86 g) and RM-998 (0.9 g) |
| CP-C | TT-935 (5.72 g) and RM-998 (3.68 g) |

The above obtained paint formulations were evaluated according to the test methods described above and results are given in Table 3. As shown in table 3, paint formulations (IP-1 to IP-7) comprising the inventive thickener blends all showed good heat-age stability after storage at 50° C. for 7 days (7D), 14 days (14D), 21 days (21D), or 28 days (28D), respectively, as indicated by KU change less than 10 units. In addition, these inventive paint formulations all demonstrated good color float stability as indicated by a color float stability score of 8 or higher after storage at room temperature for 7 days (7D) or 1 month (1M), respectively.

In contrast, the comparative paint formulations of CP-A and CP-B comprising the thickener blend of DR-180/RM-998 at a ratio of 97.5/2.5 and 90/10, respectively, showed poor heat-age storage stability, as indicated by KU change more than 10 units after storage for only 7 days and 14 days at 50° C., respectively. Both paint formulations of CP-A and CP-B also showed poor color float stability properties (e.g., score of color float stability after 1 month below 8). The comparative paint formulation of CP-C comprising the thickener blend of TT-935/RM-998 at a ratio of 70/30 showed good heat-age stability, as indicated by KU change less than 10 units after storage at 50° C. for 7 days, 14 days, 21 days, or 28 days, respectively. However, CP-C showed worse color float stability properties (e.g., the color float stability score decreased from 9 after 7-day heat-age to 4 after 1-month heat-age) as compared to IP-5.

TABLE 3

Thickening efficiency and properties of paint formulations

| Paint formulation | HASE/HEUR ratio (thickener blend) | Score of color float stability | | Thickening Efficiency | ΔKU after heat aging at 50 °C. | | | |
|---|---|---|---|---|---|---|---|---|
| | | 7 D | 1 M | (g/kg) | 7 D | 14 D | 21 D | 28 D |
| IP-1 | 97.5/2.5 (IS-1/RM-998) | 8 | 8 | 3.74 | 3.2 | 4.1 | 3.9 | 4.9 |
| IP-2 | 98/2 (IS-1/RM-998) | 10 | 9 | 3.61 | 4.4 | 4.8 | 4.9 | 3.9 |
| IP-3 | 90/10 (IS-1/RM-998) | 10 | 9 | 3.47 | 5.8 | 3.8 | 4.6 | 4.1 |
| IP-4 | 80/20 (IS-1/RM-998) | 10 | 9 | 3.59 | 1.91 | 1.8 | 0.9 | 3.6 |
| IP-5 | 70/30 (IS-1/RM-998) | 10 | 9 | 2.03 | -4.7 | -7.9 | -7.6 | -9.0 |
| IP-6 | 90/10 (IS-9/RM-998) | 10 | 9 | 1.76 | 3.1 | 3.2 | 3.8 | 3.9 |
| IP-7 | 90/10 (IS-11/RM-998) | 10 | 9 | 1.35 | 5.6 | 5.0 | 5.5 | 4 |
| CP-A | 97.5/2.5 (DR-180/RM-998) | 4 | 0 | 2.10 | 12.1 | 13.5 | 16.1 | 18 |
| CP-B | 90/10 (DR-180/RM-998) | 8 | 4 | 2.25 | 8.8 | 12.5 | 12 | 15 |
| CP-C | 70/30 (TT-935/RM-998) | 9 | 4 | 3.16 | -3.6 | -2.8 | -2.4 | -1.4 |

What is claimed is:
1. An aqueous thickener blend composition comprising:
(i) an aqueous hydrophobically-modified alkali soluble or alkali swellable thickener composition comprising a multistage polymer, wherein the multistage polymer comprises a polymer A and a polymer B at a weight ratio of the polymer A to the polymer B is from 95:5 to 55:45;

wherein the polymer A comprises, by weight based on the weight of the polymer A, (a1) 15% or more of structural units of an α, β-ethylenically unsaturated carboxylic acid, (a2) structural units of a monoethylenically unsaturated nonionic monomer, (a3) less than 0.1% of structural units of a hydrophobic associated monomer, and optionally (a4) structural units of a crosslinker selected from a $C_3$-$C_{20}$ alkylene glycol di(meth)acrylate, a poly(alkylene glycol) di(meth)acrylate, and combinations thereof; and wherein the polymer B comprises, by weight based on the weight of the polymer B, (b1) 15% or more of structural units of an α, β-ethylenically unsaturated carboxylic acid, (b2) structural units of a monoethylenically unsaturated nonionic monomer, (b3) from 0.1% to 60% by weight of structural units of a hydrophobic associated monomer, and (b4) structural units of a crosslinker selected from a $C_3$-$C_{20}$ alkylene glycol di(meth)acrylate, a poly(alkylene glycol) di(meth)acrylate, and combinations thereof; and (ii) an aqueous acid-suppressible associative thickener composition comprising, based on the weight of the aqueous acid-suppressible associative thickener composition, (a) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone, wherein one or more of the hydrophobic groups comprises a secondary amine, a tertiary amine, a tertiary phosphine, or a combination thereof, and optionally a quaternary amine, with the proviso that less than 80% of the total amine functionality is a quaternary amine;

(b) sufficient acid to substantially protonate the secondary amine, the tertiary amine, the tertiary phosphine, or a combination thereof;

(c) 40% to 99% by weight of water; and (d) zero to 15% by weight of an organic co-solvent, surfactant, cyclodextrin compound, or combination thereof;

wherein the dry weight ratio of the multistage polymer to the acid-suppressible associative thickener is in the range of from 99:1 to 65:35.

2. The aqueous thickener blend composition of claim 1, wherein the crosslinkers (a4) and (b4) are each independently selected from the group consisting of 1,3-butylene glycol dimethacrylate, 1,4-butanediol dimethacrylate, glycerol 1,3-dimethacrylate, diethylene glycol dimethacrylate, triethylene glycol dimethacrylate, tripropylene glycol dimethacrylate, 1,6-hexanediol di(meth)acrylate, neopentyl glycol di(meth)acrylate, 1,9-nonanediol di(meth)acrylate, propylene glycol diacrylate, 1,1,1-trimethylolpropane dimethacrylate, 1,1,1-trimethylolethane diacrylate, or mixtures thereof.

3. The aqueous thickener blend composition of claim 1, wherein the multistage polymer has a weight average molecular weight of from 1,000,000 to 9,000,000 daltons.

4. The aqueous thickener blend composition of claim 1, wherein the weight ratio of the polymer A to the polymer B in the multistage polymer is from 90:10 to 60:40.

5. The aqueous thickener blend composition of claim 1, wherein the hydrophobic associated monomers (a3) and (b3) each independently have the structure of formula I, $$H_2C=C(R)CO_2(CH_2CH_2O)_n(CH(R^1)CH_2O)_mR^2 \qquad (I),$$

wherein R is H or $CH_3$, $R^1$ is a $C_1$-$C_2$ alkyl group, $R^2$ is an aralkyl phenyl group or a $C_8$-$C_{50}$ linear or branched alkyl group, n is an integer of from 6 to 100, and m is an integer of from 0 to 50, provided that n≥m and m+n is from 6 to 100.

6. The aqueous thickener blend composition of claim 1, wherein the polymer A in the multistage polymer is substantially free of structural units of the hydrophobic associated monomer.

7. The aqueous thickener blend composition of claim 1, wherein the monoethylenically unsaturated nonionic monomers (a2) and (b2) are each independently alkyl esters of (meth)acrylic acids.

8. The aqueous thickener blend composition of claim 1, wherein the polymer A in the multistage polymer comprises, by weight based on the weight of the polymer A, (a1) from 20% to 60% of structural units of the α, β-ethylenically unsaturated carboxylic acid, (a2) from 40% to 80% of structural units of the monoethylenically unsaturated nonionic monomer, (a3) from 0 to 0.05% of structural units of the hydrophobic associated monomer, and (a4) from 0 to 0.25% of structural units of the crosslinker.

9. The aqueous thickener blend composition of claim 1, wherein the polymer B in the multistage polymer comprises, by weight based on the weight of the polymer B, from 0.1% to 30% of structural units of the hydrophobic associated monomer.

10. The aqueous thickener blend composition of claim 1, wherein the multistage polymer comprises:

(A) the polymer A comprising, by weight based on the weight of the polymer A, (a1) from 20% to 60% of structural units of the α, β-ethylenically unsaturated carboxylic acid, (a2) from 40% to 80% of structural units of the monoethylenically unsaturated nonionic monomer, (a3) from 0 to 0.02% of structural units of the hydrophobic associated monomer, and (a4) from 0 to 0.25% of structural units of the crosslinker; and (B) the polymer B comprising, by weight based on the weight of the polymer B, (b1) from 20% to 60% of structural units of the α, β-ethylenically unsaturated carboxylic acid, (b2) from 35% to 75% of structural units of the monoethylenically unsaturated nonionic monomer, (b3) from 1% to 10% of structural units of the hydrophobic associated monomer, and (b4) from 0.01% to 2% of structural units of the crosslinker;

wherein the weight ratio of the polymer A to the polymer B is 90:10 to 60:40.

11. The aqueous thickener blend composition of claim 1, wherein the dry weight ratio of the multistage polymer to the acid-suppressible associative thickener is from 98.5:1.5 to 70:30.

12. The aqueous thickener blend composition of claim 1, wherein the acid-suppressible associative thickener has a backbone comprising one or more polyoxyalkylene segments greater than 10 oxyalkylene units in length.

13. The aqueous thickener blend composition of claim 1, wherein the acid-suppressible associative thickener is a hydrophobically modified polyurethane polyether comprising the reaction product of a dialkylamino alkanol with a multi-functional isocyanate, a polyether diol having a weight average molecular weight between 2,000 and 12,000, and optionally a polyether triol.

14. A process of preparing an aqueous thickener blend composition, comprising admixing: (i) an aqueous hydrophobically-modified alkali soluble or alkali swellable thickener composition with (ii) an acid-suppressible associative thickener composition,
    wherein the aqueous hydrophobically-modified alkali soluble or alkali swellable thickener composition comprises a multistage polymer comprising a polymer A and a polymer B at a weight ratio of the polymer A to the polymer B is from 95:5 to 55:45;
    wherein the polymer A comprises, by weight based on the weight of the polymer A,
    (a1) 15% or more of structural units of an $\alpha, \beta$-ethylenically unsaturated carboxylic acid,
    (a2) structural units of a monoethylenically unsaturated nonionic monomer,
    (a3) less than 0.1% of structural units of a hydrophobic associated monomer, and optionally
    (a4) structural units of a crosslinker selected from a $C_3$-$C_{20}$ alkylene glycol di(meth)acrylate, a poly(alkylene glycol) di(meth)acrylate, and combinations thereof; and
    wherein the polymer B comprises, by weight based on the weight of the polymer B,
    (b1) 15% or more of structural units of an $\alpha, \beta$-ethylenically unsaturated carboxylic acid,
    (b2) structural units of a monoethylenically unsaturated nonionic monomer,
    (b3) from 0.1% to 60% by weight of structural units of a hydrophobic associated monomer, and
    (b4) structural units of a crosslinker selected from a $C_3$-$C_{20}$ alkylene glycol di(meth)acrylate, a poly(alkylene glycol) di(meth)acrylate, and combinations thereof; and
    wherein the aqueous acid-suppressible associative thickener composition comprises, based on the weight of the aqueous acid-suppressible associative thickener composition,
    (a) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone, wherein one or more of the hydrophobic groups comprises a secondary amine, a tertiary amine, a tertiary phosphine, or a combination thereof, and optionally a quaternary amine, with the proviso that less than 80% of the total amine functionality is a quaternary amine;
    (b) sufficient acid to substantially protonate the secondary amine, the tertiary amine, the tertiary phosphine, or a combination thereof;
    (c) 40% to 99% by weight of water; and
    (d) zero to 15% by weight of an organic co-solvent, surfactant, cyclodextrin compound, or combination thereof;
    wherein the dry weight ratio of the multistage polymer to the acid-suppressible associative thickener is in the range of from 99:1 to 65:35.

15. An aqueous coating composition comprising an aqueous thickener blend composition of claim 1 and a binder.

* * * * *